US010235428B2

(12) United States Patent
Varadarajan et al.

(10) Patent No.: US 10,235,428 B2
(45) Date of Patent: *Mar. 19, 2019

(54) DISCOVERY OF NEWS-RELATED CONTENT

(71) Applicant: Google LLC, Mountain View, CA (US)

(72) Inventors: Balakrishnan Varadarajan, Mountain View, CA (US); Sudheendra Vijayanarasimhan, Mountain View, CA (US); Sanketh Shetty, Sunnyvale, CA (US); Nisarg Dilipkumar Kothari, Sunnyvale, CA (US); Nicholas Delmonico Rizzolo, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,105

(22) Filed: Jun. 28, 2016

(65) Prior Publication Data

US 2016/0306804 A1    Oct. 20, 2016

Related U.S. Application Data

(63) Continuation of application No. 13/827,573, filed on Mar. 14, 2013, now Pat. No. 9,384,242.

(51) Int. Cl.
*G06F 17/30* (2006.01)
*G10L 25/54* (2013.01)
(Continued)

(52) U.S. Cl.
CPC .. *G06F 17/30551* (2013.01); *G06F 17/30029* (2013.01); *G06F 17/30554* (2013.01);
(Continued)

(58) Field of Classification Search
None
See application file for complete search history.

(56) References Cited

U.S. PATENT DOCUMENTS 6,954,900 B2    10/2005  Yu et al.
2002/0146168 A1  10/2002  Lee et al.
(Continued)

OTHER PUBLICATIONS

Good, R., "Search Video and TV Content by Keywords Spoken in the Content", last updated Aug. 2, 2005, pp. 1-10, available at: http://www.masternewmedia.org/video_search/video_indexing/search_video_recordings_by_keywords_20050802.htm.
(Continued)

*Primary Examiner* — Son T Hoang
(74) *Attorney, Agent, or Firm* — Byrne Poh LLP

(57) ABSTRACT

Techniques identify time-sensitive content and present the time-sensitive content to communication devices of users interested or potentially interested in the time-sensitive content. A content management component analyzes video or audio content, and extracts information from the content and determines whether the content is time-sensitive content, such as recent news-related content, based on analysis of the content and extracted information. The content management component evaluates user-related information and the extracted information, and determines whether a user(s) is likely to be interested in the time-sensitive content based on the evaluation results. The content management component sends a notification to the communication device(s) of the user(s) in response to determining the user(s) is likely to be interested in the time-sensitive content.

21 Claims, 8 Drawing Sheets

(51) Int. Cl.
 *H04L 12/58* (2006.01)
 *H04L 29/08* (2006.01)

(52) U.S. Cl.
 CPC ........ *G06F 17/30867* (2013.01); *G10L 25/54* (2013.01); *H04L 51/32* (2013.01); *H04L 67/306* (2013.01)

(56) References Cited

U.S. PATENT DOCUMENTS

| | | |
|---|---|---|
| 2003/0123850 A1 | 7/2003 | Jun et al. |
| 2005/0086682 A1* | 4/2005 | Burges .................. H04H 20/16 725/19 |
| 2006/0200475 A1* | 9/2006 | Das .................. G06F 17/30256 |
| 2007/0094245 A1 | 4/2007 | Vigil |
| 2008/0193101 A1 | 8/2008 | Agnihotri et al. |
| 2009/0019009 A1* | 1/2009 | Byers ................ G06F 17/30796 707/999.001 |
| 2009/0044235 A1* | 2/2009 | Davidson ............... G06Q 30/06 725/87 |
| 2010/0070454 A1* | 3/2010 | Masuda ............. H04N 7/17318 706/54 |
| 2010/0106733 A1 | 4/2010 | Podduturi et al. |
| 2012/0254917 A1* | 10/2012 | Burkitt .............. G06F 17/30817 725/40 |
| 2012/0272160 A1 | 10/2012 | Spivack et al. |
| 2013/0007260 A1 | 1/2013 | Jain et al. |
| 2014/0129625 A1 | 5/2014 | Haugen et al. |
| 2014/0163969 A1 | 6/2014 | Chattopadhyay |

OTHER PUBLICATIONS

Office Action dated Aug. 21, 2015 in U.S. Appl. No. 13/827,573.
ShadowTV, pp. 1, available at: http://www.shadowtv.com/overview.jsp, last accessed Mar. 21, 2013.
Office Action dated Apr. 17, 2015 in U.S. Appl. No. 13/827,573.
Office Action dated Oct. 14, 2014 in U.S. Appl. No. 13/827,573.
Notice of Allowance dated Mar. 4, 2016 in U.S. Appl. No. 13/827,573.

* cited by examiner

DISCOVERY OF NEWS-RELATED CONTENT

CROSS-REFERENCE TO RELATED APPLICATION

This application is a continuation of U.S. patent application Ser. No. 13/827,573, filed Mar. 14, 2013, which is hereby incorporated by reference herein in its entirety.

TECHNICAL FIELD

This disclosure relates generally to analysis and processing of content, and more specifically to discovering news-related content.

BACKGROUND

Communication devices, such as, for example, computers, mobile phones, electronic tablets, televisions or devices associated with televisions, can be used to view content, such as video content and/or audio content. Communication devices also can be used to upload content (e.g., video files (e.g., digital files comprising video content), audio files (e.g., digital files comprising songs), etc.), for example, to a server associated with a video provider or sharing service, wherein the uploaded content can be available for viewing by other users using other communication devices. Conventionally, users can search for uploaded content using, for example, a search engine by providing a search query to the search engine via a communication network, wherein the search query can include terms (e.g., keywords, keyphrases, etc.) indicating the type of content a user desires the search engine to provide in the search results.

Certain information, such as news-related information (e.g., news video and/or audio), can be more time sensitive than other information (e.g., song videos) because, for some news items, the importance, interest level, significance, or newsworthiness of news-related information may decrease over time for users. Also, for a variety of reasons, users may not be aware of recent news items, for example, contained in news-related videos that have recently been uploaded to the server associated with the video provider or sharing service.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Disclosed herein is a system that comprises at least one memory that stores computer executable components; and at least one processor that executes the following computer executable components stored in the at least one memory. The computer executable components comprise a content identifier component that determines whether content includes news-related content based at least in part on a set of items of information extracted from the content and a defined content identification criterion defining whether content is news-related content, wherein the content comprises at least one of video content or audio content. The computer executable components also comprise an interest identifier component that, in response to a determination that the content includes news-related content, determines whether a user meets a defined interest level in the content based at least in part on a comparison of the set of items of information associated with the content to a set of items of information in a user profile associated with the user meeting a defined match criterion.

Also disclosed herein is a method that includes employing at least one processor to facilitate execution of code instructions retained in at least one memory device. The at least one processor, in response to execution of the code instructions, performs operations comprising: determining whether content is news content based at least in part on a set of items of information extracted from the content and a defined content identification criterion defining news, wherein the content comprises at least of one of video content or audio content; and in response to determining that the content is the news content, determining whether a user meets a defined interest level in the content based at least in part on a defined match criterion and comparison results from comparing the set of items of information associated with the content to a set of items of information in a user profile associated with the user.

Also disclosed herein is a tangible computer-readable storage medium comprising computer-executable instructions that, in response to execution, cause a system including a processor to perform operations. The operations comprise determining whether content is news based at least in part on a set of items of information extracted from the content and a defined content identification criterion defining news, wherein the content comprises at least of one of video content or audio content; and, in response to determining that the content is news, determining whether a user meets a defined interest level in the content based at least in part on a defined match criterion and comparison results obtained from comparing the set of items of information associated with the content to a set of items of information in a user profile associated with the user.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
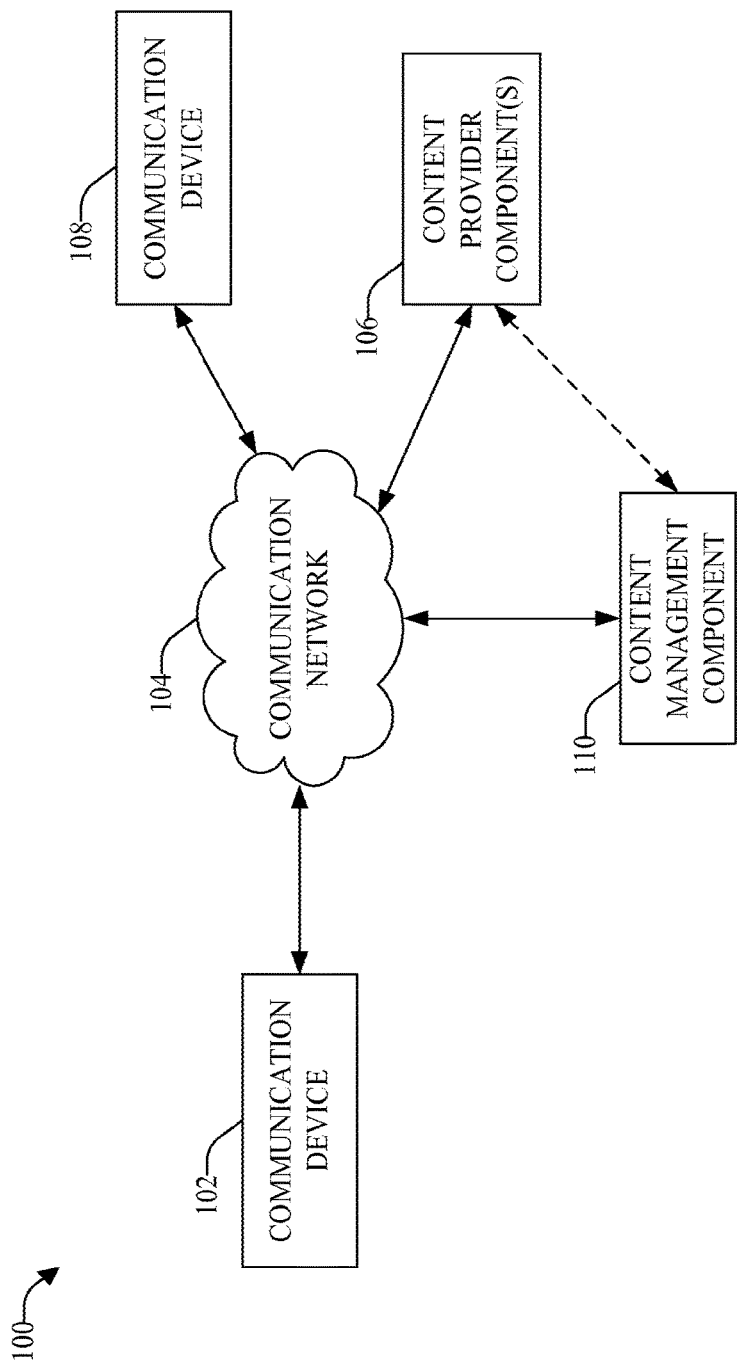
FIG. 1 illustrates a block diagram of an example system that can identify time-sensitive and/or news-related content (e.g., recently uploaded news-related content) and notify a communication device associated with a user potentially interested in the content, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Communication devices, such as, for example, computers, mobile phones, electronic tablets, televisions or devices associated with televisions, can be used to view content, such as video content and/or audio content, and/or upload content, for example, to a server associated with a video provider or sharing service, wherein the uploaded content can be available for viewing by other users using other communication devices. Conventionally, users can search for uploaded content using, for example, a search engine by providing a search query to the search engine via a communication network, wherein the search query can include terms (e.g., keywords, keyphrases, etc.) indicating the type of content a user desires the search engine to provide in the search results.

Certain information, such as news-related information (e.g., news video and/or audio), can be more time sensitive than other information (e.g., song videos) because, for some news items, the importance, interest level, significance, or newsworthiness of news-related information may decrease over time for users. Also, for a variety of reasons, users may not be aware of recent news items, for example, contained in news-related videos that have recently been uploaded to the server associated with the video provider or sharing service.

When content is uploaded to a server, the user who uploaded the video may or may not add a description of the uploaded content. Also, other users who view the uploaded content may or may not add descriptive information relating to the uploaded content at the online page (e.g., web page) of the uploaded content, or other users can use their communication devices to provide an online page that can include a hyperlink to the online page containing the content and descriptive information relating to the content. For some uploaded content, the descriptive information relating to the content that can be available online can build up over time. However, often, when the content has only recently been uploaded, there can be relatively little or no descriptive information relating to the uploaded content available online (e.g., on the web page containing the content or web page(s) referencing or linking to the content). If a user enters a search query to search for certain content relating to a topic based on the keywords in the query, and an uploaded video is relevant to the topic, but does not have sufficient descriptive textual information or hyperlinks associated with it that would result in that uploaded video being identified as a search result by the search engine (e.g., because the descriptive textual information does not include words associated with the search query), the user may miss the opportunity to view this uploaded video, even though the uploaded video was relevant to the search query. With regard to time-sensitive content, such as news-related content, the lack of descriptive information relating to the time-sensitive content may result in the user missing the opportunity to perceive (e.g., view, listen to) the time-sensitive content altogether or until at least the time period where the time-sensitive content has relevance or is of significant interest to the user has elapsed (e.g., the news-related video has become "old news").

To that end, techniques for identifying time-sensitive content (e.g., recent news-related content) and presenting the time-sensitive content to communication devices of users interested or potentially interested in the time-sensitive content are presented. A content management component can analyze video or audio content, such as content recently uploaded to a server associated with a content provider or sharing service. The content management component can extract information or signals from the content based at least in part on the analysis of the content. For example, the content management component can analyze the video or audio content, and can identify a person(s) (e.g., President of the United States, a member of Congress, a celebrity, a news person, etc.), a place(s) (e.g., a landmark, a type of place or building, etc.), a location(s) (e.g., a geographical location, a street address, etc.), thing(s) (e.g., a type or brand of product, etc.), an event(s) (e.g., a news-related event), textual content (e.g., textual information shown in the video content), etc., within the content or referenced in the content, using pattern recognition, audio recognition, character recognition (e.g., optical character recognition), and/or other recognition techniques or algorithms. The content management component also can analyze information or signals associated with the content, such as descriptive information provided by the user who uploaded the content or descriptive information (e.g., user comments) relating to the content as provided by other users.

The content management component also can include a database that can include information relating to person(s), place(s), location(s), thing(s), event(s), etc., to facilitate determining whether information extracted from or identified in, or identified in relation to, the content is time-sensitive content (e.g., news-related content). The content management component can compare the information associated with the content with the information stored in the database, and, based at least in part on that comparison, the content management component can determine (e.g., automatically or dynamically determine) whether the content is time-sensitive content, such as recent news-related content.

In response to identifying content as time-sensitive content, the content management component can present a notification or indication that the content is time-sensitive content, tag the content as time-sensitive content, present an identification of the type of content (e.g., news-related content) that the content is, etc., to facilitate notifying users accessing the content provider or sharing service that the content is time-sensitive and/or what type of time-sensitive content the content is. For example, the content management component can present notification information (e.g., a hyperlink, brief description, indication of when or how long ago the event (e.g., news event) presented in the time-sensitive content occurred, thumbnail visual image, tag words, etc.) on an online page associated with the content provider or sharing service, wherein the notification information can indicate to users viewing the online page that the content is recent or time-sensitive content.

In some implementations, the content management component can match time-sensitive content with a user(s) based at least in part on user-related information (e.g., user preferences or interests, content viewing history, demographic information, etc.) associated with the user(s) (e.g., as contained in a user profile(s) of a user(s)) and a defined match criterion(s). The content management component can evaluate the user-related information associated with a user and the extracted or identified information associated with the time-sensitive content to facilitate determining whether the user will have or at least potentially will have an interest in the time-sensitive content. Based at least in part on the evaluation of the user-related information associated with the user and the extracted or identified information associated with the time-sensitive content, the content management component can determine (e.g., automatically or dynamically determine) whether the user will be interested or at least potentially will be interested in the time-sensitive content. For example, based at least in part on the evaluation, the content management component can determine an interest score for the user in relation to the time-sensitive content, and, if the score at least meets a defined threshold interest score, which indicates the user will at least potentially be interested in the time-sensitive content, the content management component can determine that the user at least potentially will be interested in the time-sensitive content. In response to determining that the user will or at least potentially will be interested in the time-sensitive content, the content management component can transmit a notification to the communication device and/or destination address (e.g., email address, social networking address, phone number, etc.) associated with the user. The communication device can receive the notification and can present the notification to the user to facilitate notifying the user of the availability of the time-sensitive content, wherein the notification also can include a description of the time-sensitive content (e.g., a brief description or summary of the time-sensitive content), a link (e.g., hyperlink) to the time-sensitive content, information that can indicate when or how long ago the event (e.g., news event) presented in the time-sensitive content occurred, an identified interest level (e.g., high interest level, very high interest level, etc.; 80% interest level, 90% interest level, etc.) that can indicate the interest level the content management component has identified for the user in relation to the content, etc.

Referring now to the drawings, FIG. 1 illustrates a block diagram of an example system 100 that can identify time-sensitive and/or news-related content (e.g., recently uploaded news-related content) and notify a communication device associated with a user potentially interested in the content, in accordance with various aspects and implementations described herein. The system 100 can include a communication device 102 that can receive or transmit information (e.g., video content, audio content, textual information or messages, etc.). The communication device 102 can be or can include, for example, a television, an IPTV, a set-top box, a computer, a content-streaming device, a mobile phone, an electronic tablet, an electronic pad, electronic notebook, an electronic reader, an electronic gaming device, a personal digital assistant (PDA), an electronic device (e.g., electronic eyewear or bodywear) comprising information communication functionality, etc.

The communication device 102 can be associated with (e.g., communicatively connected to) a communication network 104 that can facilitate communication (e.g., receiving, transmitting) of information between the communication device 102 and other communication devices associated with the communication network 104. The communication network 104 can include an Internet protocol (IP)-based network and/or a core network (e.g., mobile core network) that can facilitate wireline or wireless communication of information between the communication device 102 and other communication devices, such as the content provider component(s) 106 and/or the communication device 108, associated with the communication network 104. The content provider component(s) 106 can be, for example, a server(s) (e.g., video server, news server, email server, and/or other content server) that can receive content (e.g., video, audio, and/or textual content) from communication devices (e.g., communication device 108) associated with the communication network 104, store the content, and provide the content (e.g., allow the accessing, downloading, or streaming of the content) by communication devices (e.g., communication device 102) associated with the communication network 104.

The system 100 also can comprise a content management component 110 that can be associated with the communication network 104 to facilitate keeping users abreast of time-sensitive content. In some implementations, the content management component 110 can be associated with (e.g., communicatively connected to) the content provider component(s) 106 without communicating via the communication network 104. The content management component 110 can facilitate identifying time-sensitive content (e.g., recent news-related content, such as recent news-related video or audio content). The content management component 110 also can facilitate identifying users (e.g., user associated with the communication device 102) who are interested or potentially interested in the time-sensitive content associated with the content provider component(s) 106 (e.g., matching interested or potentially interested users with the time-sensitive content), communicating (e.g., timely communicating) notification messages or signals to communication devices (e.g., the communication device 102) of such users to notify the users of the time-sensitive content, and/or presenting (e.g., timely presenting) the time-sensitive content to the communication devices (e.g., the communication device 102) of such users. The identification or determination of whether content is time-sensitive and/or recent, and/or news related, can be based at least in part on the amount of time that has elapsed between the event(s) or news(s) contained in the content and the time of the determination of whether the content is time sensitive (or time of upload of the content), the type of event(s) or news(s) contained in the content (e.g., some types of events or news can have a longer time period of relevancy or time period of newsworthiness than other types of events or news), the entities (e.g., person(s), place(s), thing(s), etc.) identified in the content, contextual information in or associated with the content, and/or other factors or criterion(s) (e.g., defined content identification criterion(s)).

For instance, the content management component 110 can determine that content is time sensitive when the event presented in the content is determined to have occurred within an applicable defined threshold period of time from the time of the content analysis by the content management component 110, in accordance with the defined content identification criterion(s). The applicable defined threshold period of time can indicate the time window within which an event (e.g., news-related event) presented in the content is considered or determined to be time sensitive in relation to the time of the content analysis. The applicable defined threshold period of time for particular content can be based at least in part on the type of event or news presented in that content, for example. The applicable defined threshold period of time can be different for different types of events or news, as some types of events or news can have a longer time period of relevancy or time period of newsworthiness than other types of events or news. The defined content identification criterion(s) can indicate or specify which defined threshold period of time is to be applied to a particular type of event or news presented in particular content. The content management component 110 can determine which defined threshold period of time to apply to the particular type of event or news to facilitate determining whether the content is time sensitive, based at least in part on the defined content identification criterion(s).

The content management component 110 can analyze content (e.g., video or audio content) such as content recently uploaded to the content provider component(s) 106 (e.g., a server(s) associated with a content provider or sharing service). The content management component 110 can extract information or signals from the content based at least in part on the analysis of the content. For example, the content management component 110 can analyze the video or audio content, and can identify a person(s) (e.g., President of the United States, a member of Congress, a celebrity, a news person, etc.), a place(s) (e.g., a landmark, a type of place or building, etc.), a location(s) (e.g., a geographical location, a street address, etc.), a thing(s) (e.g., a type or brand of product, etc.), an event(s) (e.g., a news-related event), textual content (e.g., textual information shown in the video content or presented in the audio content), etc., within the content or referenced in the content, using pattern recognition, audio recognition, character recognition (e.g., optical character recognition), and/or other recognition techniques or algorithms. The content management component 110 also can analyze information or signals associated with the content, such as textual information (e.g., closed-caption text) associated with the content, metadata associated with the content (e.g., date or time the content was captured or generated), descriptive information provided by the user who uploaded the content, or descriptive information (e.g., user comments) relating to the content as provided by other users.

In some implementations, to facilitate determining or predicting whether content is time-sensitive content and/or news-related content, the content management component 110 can employ a model (e.g., a modeling component) for determining or predicting whether content is time-sensitive content and/or news-related content. The content management component 110 can represent this model as a vector of binary values, wherein each bit of the vector can correspond to an entity (e.g., person, place, thing, etc.), a word, a phrase, a search query, a tag, etc. The content management component 110 can use this representation of the model to facilitate classifying items, including video or audio content, from a variety of content corpora (e.g., content sharing or streaming providers).

The content management component 110 can determine or compute the binary values in the vector associated with the model based at least in part on the information or signals extracted from the content (e.g., based at least in part on the analysis of the content), metadata associated with the content (e.g., date or time the content was captured or generated), and/or textual information associated with the content (e.g., textual and/or descriptive information associated with the content (e.g., video), as provided by the user who uploaded the video to the content provider component 106 and/or users commenting on the video and/or linking (e.g., hyperlinking) to the video). The content management component 110 can analyze the binary values in the vector associated with the content, and can facilitate determining, predicting, or classifying whether the content is time-sensitive content and/or news-related content based at least in part on the results of the analysis of the binary values in the vector associated with the content and a defined content identification criterion(s), wherein the defined content identification criterion(s) can define, delineate, specify, or describe what constitutes time-sensitive content, what constitutes news-related content, etc.

The content management component 110 also can include a database component (e.g., a database(s)) that can include information relating to person(s), place(s), location(s), thing(s), event(s), etc., and/or binary values in a vector relating to items or content, to facilitate identifying a person(s), place(s), location(s), thing(s), event(s), etc., in or associated with the video or audio content, determining when or how long ago an event(s) (e.g., news event(s)) presented in the content occurred, and determining (e.g., automatically or dynamically determining) whether information extracted from or identified in, or identified in relation to, the content is time-sensitive content (e.g., news-related content), based at least in part on the defined content identification criterion(s). The content management component 110 can compare the information associated with the content with the information stored in the database. Based at least in part on the results of such comparison, the content management component can identify a person(s), place(s), location(s), and/or thing(s), etc., in or associated with the video or audio content, determine when or how long ago an event(s) presented in the content occurred, and can determine whether the content is time-sensitive content (e.g., determine whether the event(s) presented in the content occurred within a defined amount of time of the current time of analysis of the content by the content management component 110), such as recent news-related content.

In response to identifying content as being time-sensitive content, the content management component 110 can generate and present a notification or indication that the content is time-sensitive content, tag the content as time-sensitive content, present an identification of the type of content (e.g., news-related content) that the content is, etc., to facilitate notifying users accessing the content provider component(s) 106 (e.g., content provider or sharing service) or associated with the content management component 110 that the content is time-sensitive and/or what type of time-sensitive content the content is. For example, the content management component 110 can present notification information (e.g., a hyperlink, brief description, indication of when or how long ago the event (e.g., news event) presented in the time-sensitive content occurred, thumbnail visual image, tag words, etc.) on an online page associated with the content provider component(s) 106 or content management component 110, wherein the notification information can indicate to users viewing the online page that the content is recent or time-sensitive content and/or the type of content (e.g., news-related content associated with one or more topics, tags, or keywords/keyphrases) that the content is.

In some implementations, the content management component 110 can match (e.g., automatically or dynamically match) time-sensitive content with a user(s) based at least in part on a defined match criterion(s) and user-related information (e.g., user preferences or interests, content viewing history, demographic information, etc.) associated with the user(s), e.g., as contained in a user profile(s) of a user(s), wherein the user profile(s) can be stored in a data store associated with the content management component 110. The content management component 110 can evaluate the user-related information associated with a user and the extracted or identified information associated with the time-sensitive content to facilitate determining (e.g., automatically or dynamically determining) whether the user will have or at least potentially will have an interest in the time-sensitive content.

Based at least in part on the evaluation of the user-related information associated with the user and the extracted or identified information associated with the time-sensitive content, the content management component 110 can determine whether the user will be interested or at least potentially will be interested in the time-sensitive content. For example, based at least in part on the evaluation, the content management component 110 can calculate or determine an interest score for the time-sensitive content in relation to (e.g., in connection with) the user. A higher interest score for a user can indicate that the user has or at least potentially will have a higher level of interest in the time-sensitive content than the level of interest or potential level of interest associated with a lower interest score.

If the interest score at least meets a defined threshold interest score, which indicates the user will at least potentially be interested in the time-sensitive content, the content management component 110 can determine that the user at least potentially will be interested in the time-sensitive content. If the interest score does not meet the defined threshold interest score, which can indicate the user is not interested or at least is not likely to be interested in the time-sensitive content, the content management component 110 can determine that the user is not interested or at least is not likely to be interested in the time-sensitive content.

In response to determining that the user (e.g., the user associated with the communication device 102) will or at least potentially will be interested in the time-sensitive content, the content management component 110 can generate (e.g., automatically or dynamically generate) a notification message and can transmit (e.g., automatically or dynamically transmit) the notification message to the communication device 102 and/or destination address (e.g., email address, social networking address, phone number, etc.) associated with the user. The communication device 102 can receive the notification message and can present the notification to the user to facilitate notifying the user of the availability of the time-sensitive content. The notification message can include a description of the time-sensitive content (e.g., a brief description or summary of the time-sensitive content), a link (e.g., hyperlink) to the time-sensitive content, information that can indicate when or how long ago the event (e.g., news event) presented in the time-sensitive content occurred, an identified interest level (e.g., high interest level, very high interest level, etc.; 80% interest level, 90% interest level, etc.) that can indicate the interest level the content management component has identified for the user in relation to the content, etc. As desired, the user can use the communication device 102 to access and view the time-sensitive content.

In some implementations, to facilitate determining or predicting whether a user(s) will have the defined level of interest in the time-sensitive content and/or news-related content to trigger sending a notification to the communication device(s) 102 of the user(s), the content management component 110 can employ an interest or match model (e.g., an interest or match modeling component) for determining, predicting, or classifying whether a user(s) will have the defined level of interest (e.g., a level of interest that meets or exceeds (e.g., satisfies) the defined threshold level of interest) in the time-sensitive content and/or news-related content to trigger sending a notification to the communication device(s) 102 of the user(s). The content management component 110 can represent this interest or match model as a vector of binary values, wherein each bit of the vector can correspond to an entity (e.g., person, place, thing, etc.), a word, a phrase, a search query, a tag, etc. The content management component 110 can use this representation of the interest or match model to facilitate classifying items, including video or audio content, from a variety of content corpora (e.g., content sharing or streaming providers).

The content management component 110 can determine or compute the binary values in the vector associated with the model based at least in part on the information or signals extracted from the content (e.g., based at least in part on the analysis of the content), metadata associated with the content, and/or textual information associated with the content (e.g., textual and/or descriptive information associated with the content (e.g., video), as provided by the user who uploaded the video to the content provider component 106 and/or users commenting on the video and/or linking (e.g., hyperlinking) to the video). The content management component 110 can analyze the binary values in the vector associated with the content, and can facilitate determining, predicting, or classifying whether a user(s) will have the defined level of interest (e.g., a level of interest that meets or exceeds (e.g., satisfies) the defined threshold level of interest) in the time-sensitive content and/or news-related content to trigger sending a notification to the communication device(s) 102 of the user(s), based at least in part on the results of the analysis of the binary values in the vector associated with the content.

As an example describing certain aspects of the disclosed subject matter, on Jan. 21, 2013, a video file can be uploaded to the content provider component 106 by the communication device 108. The video file can comprise video content of President Obama giving his inauguration address in front of the U.S. Capitol in Washington, D.C. on Jan. 21, 2013, from 11:53 a.m. to 12:12 p.m., Eastern Time. In some implementations, the content management component 110 can monitor the uploading of content to a content provider component(s) 106 and can detect content, including the video file, newly uploaded to the content provider component(s) 106.

The content management component 110 can analyze the video file comprising video content of President Obama giving his inauguration address using pattern recognition, audio recognition, character recognition (e.g., optical character recognition), and/or other recognition techniques or algorithms. Based at least in part on the analysis of the video content and the information stored in the database, the content management component 110 can identify President Obama in the video (e.g., based on facial or pattern recognition of his facial features, based on audial recognition of his voice, based on audio statements of commentators in the video identifying President Obama, based on textual information identifying President Obama as presented in or associated with the video, etc., for example, in comparison with the visual or audio information regarding President Obama stored in the database).

As further part of the analysis of the video content and the information stored in the database, the content management component 110 can identify the U.S. Capitol and/or other Washington D.C. landmarks shown in the video (e.g., based on pattern recognition of the features of the landmark(s), based on audio statements of commentators in the video identifying the landmark(s), based on textual information that identifies the landmark(s) as presented in or associated with the video, etc., for example, in comparison with the visual or audio information regarding the landmark(s) stored in the database. As further part of the analysis of the video content and the information stored in the database, the content management component 110 also can identify the date (e.g., Jan. 21, 2013) and time (e.g., from 11:53 a.m. to 12:12 p.m., Eastern Time) of the event (e.g., President Obama's inauguration address), the time (e.g., 12:15 p.m., Eastern Time) of the uploading of video file, and/or the current time (e.g., 12:16 p.m., Eastern Time) of the analysis of the video content, to facilitate determining how recent the event in the video content is. Also, by accessing the information in the database, the content management component 110 can determine or learn that President Obama was scheduled to give his inauguration speech in front of the U.S. Capitol on Jan. 21, 2013, at approximately 12 p.m., Eastern Time.

Based at least in part on the information in the database, the results of the analysis of the video content, and other information (e.g., identified time of the occurrence of the event in the video, time of uploading of video, time of analysis of the video, etc.) associated with the video content, the content management component 110 can determine that the event of President Obama giving his inauguration speech in front of the U.S. Capitol on Jan. 21, 2013 is a time-sensitive event and/or news-related event (e.g., is a recent news-related event, based at least in part on the video comprising information relating to an event that occurred within a defined time (e.g., a relatively short time) prior to the current time), and, as a result, the video content is time-sensitive content. Based at least in part on the information in the database and the results of the analysis of the video content, the content management component 110 also can determine that the time-sensitive event in the video is a news-related event, and the video content comprising this news-related event is associated with topics, such as, for example, politics, Democratic Party, national news, federal government, and President.

In response to identifying the content as time-sensitive and/or news-related content, the content management component 110 can determine or predict whether a user(s) will have or at least potentially will have an interest (e.g., a defined threshold level of interest) in this time-sensitive and/or news-related content based at least in part on an analysis of user-related information (e.g., user preferences or interests, content viewing history, demographic information, etc.) associated with the user, as contained in a user profile associated with the user, the information associated with the content (e.g., extracted information or other identified information associated with the content, identified topics relating to the content, etc.), and the defined match criterion(s). A user profile associated with a first user comprises user-related information indicating that the first user is interested in politics, President Obama, national news, and Democratic Party. The content management component 110 can determine or calculate an interest score based at least in part on the user-related information for the first user and the information associated with the content, wherein the first user and content have at least the following in common: politics, President Obama, national news, and Democratic Party.

In some implementations, to facilitate determining an interest score, the content management component 110 can represent the information associated with the content and the user-related information associated with the first user as a vector of binary values, as more fully disclosed herein. The content management component 110 can compare the interest score associated with the first user with a defined threshold interest score that can indicate whether the first user will have or at least potentially will have a sufficient level of interest in the time-sensitive and/or news-related content to trigger sending a notification to the first user, wherein the defined threshold interest score can be based at least in part on the defined match criterion. In this example case, the content management component 110 can determine that the interest score associated with the first user is relatively high and is higher than the defined threshold interest score (e.g., can determine that there is a match between the first user and the time-sensitive and/or news-related content). In response to determining that there is a match between the first user and the time-sensitive and/or news-related content, the content management component 110 can generate a notification message comprising information relating to the time-sensitive and/or news-related content (e.g., a hyperlink to the content, a brief description of the content, etc.). The content management component 110 can transmit the notification message to the communication device 102 associated with the first user to facilitate notifying the first user of the time-sensitive and/or news-related content that is or at least likely may be of interest to the first user.

In a second example case involving a second user, a second user profile associated with the second user comprises user-related information indicating that the second user is interested in music, Def Leppard, Whitesnake, and television sitcoms. The content management component 110 can determine or calculate an interest score based at least in part on the user-related information for the second user and the information associated with the content, wherein the content management component 110 can determine or identify that the second user and the content have minimal or no things in common, which can result in the interest score being relatively low. The content management component 110 can compare the interest score associated with the second user with the defined threshold interest score. In this second example case, the content management component 110 can determine that the interest score associated with the second user is relatively low and is lower than the defined threshold interest score (e.g., can determine that there is no match between the second user and the time-sensitive and/or news-related content). In response to determining that there is no match between the second user and the time-sensitive and/or news-related content, the content management component 110 can determine that no notification message is to be sent to the communication device associated with the second user.

Figure 2:
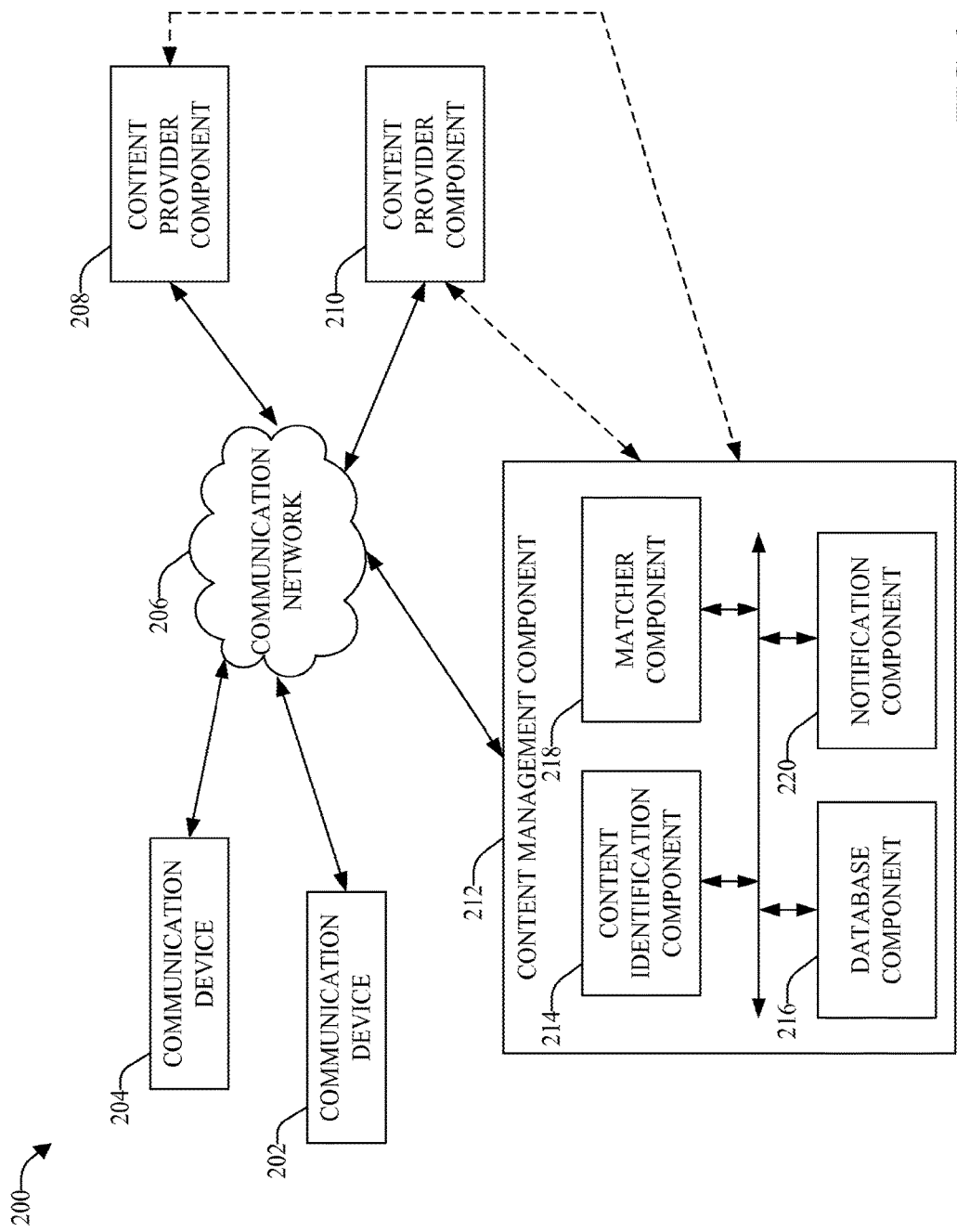
FIG. 2 depicts a block diagram of an example system that can identify time-sensitive and/or news-related content and notify a communication device associated with a user potentially interested in the content, in accordance with various aspects and implementations of the disclosed subject matter.

Turning to FIG. 2, depicted is a block diagram of another example system 200 that can identify time-sensitive and/or news-related content and notify a communication device associated with a user potentially interested in the content, in accordance with various aspects and implementations of the disclosed subject matter. The system 200 can include communication device 202, communication device 204, communication network 206, content provider component 208, content provider component 210, and content management component 212, which each can respectively be the same as or similar to, and/or can comprise the same or similar functionality as, respective components (e.g., respectively named components), as more fully disclosed herein.

At various times, a communication device(s), such as the communication device 204, can upload content, such as video and/or audio content, to content provider components, such as content provider component 208 and/or content provider component 210, that can be respectively associated with content provider or sharing services. The content management component 212 can comprise a content identifier component 214 (e.g., content classifier component) that can analyze content (e.g., video and/or audio content, and/or information (e.g., textual information) associated therewith), such as content uploaded (e.g., newly or recently uploaded) to a content provider component (e.g., 208 or 210). The content management component 212 can determine or predict whether the content is time-sensitive and/or news-related content based at least in part on the results of the content analysis, as more fully described herein (e.g., as more fully described herein with regard to the content management component).

The content management component 212 also can include a database component 216 that that can include information relating to a person(s), place(s), location(s), thing(s), event(s), etc., and/or binary values in a vector relating to items or content, to facilitate identifying a person(s), place(s), location(s), thing(s), event(s), etc., in or associated with the video or audio content, and determining whether information extracted from or identified in, or identified in relation to, the content is time-sensitive content (e.g., news-related content), as more fully described herein (e.g., as more fully described herein with regard to the content management component).

The content management component 212 further can include a matcher component 218 (e.g., an interest identifier component) that can facilitate matching time-sensitive and/or news-related content with a user who will be interested or at least potentially will be interested in the time-sensitive and/or news-related content. The matcher component 218 can determine or calculate an interest score that can indicate a level of interest the user has or at least potentially may have in the time-sensitive and/or news-related content based at least in part on the analysis of the content and user-related information contained in a user profile associated with the user, as more fully described herein (e.g., as more fully described herein with regard to the content management component). The matcher component 218 can determine whether the interest score satisfies (e.g., meets or exceeds) a defined threshold interest score to facilitate determining whether there is a match between the user and the content, as more fully described herein (e.g., as more fully described herein with regard to the content management component). For instance, the matcher component 218 can determine that there is a match between a user and the time-sensitive and/or news-related content in response to determining that the interest score associated with the user in connection with the content satisfies the defined threshold interest score.

The content management component 212 also can comprise a notification component 220 that can generate notification messages that can be sent to communication devices (e.g., 202) associated with users who have an interest or at least potentially will have an interest in the time-sensitive and/or news-related content, for example, in response to the content management component 212 determining that the user will have or at least potentially will have an interest in the time-sensitive and/or news-related content, as more fully described herein (e.g., as more fully described herein with regard to the content management component). The content management component 212 can transmit the notification message to the communication device 202 and/or destination address (e.g., email address, social networking address, phone number, etc.) associated with the user to facilitate notifying the user about the time-sensitive and/or news-related content.

The communication device 202 can receive the notification message and can present (e.g., display, audially present, present via device vibration, etc.) the notification to the user to facilitate notifying the user of the availability of the time-sensitive and/or news-related content. The notification message can include a description of the time-sensitive content (e.g., a brief description or summary of the time-sensitive and/or news-related content), a link (e.g., hyperlink) to the time-sensitive and/or news-related content, information that can indicate when or how long ago the event (e.g., news event) presented in the time-sensitive content occurred, an identified interest level that can indicate the interest level the content management component has identified for the user in relation to the content, etc. As desired, the user can use the communication device 202 to access and view the time-sensitive content.

Figure 3:
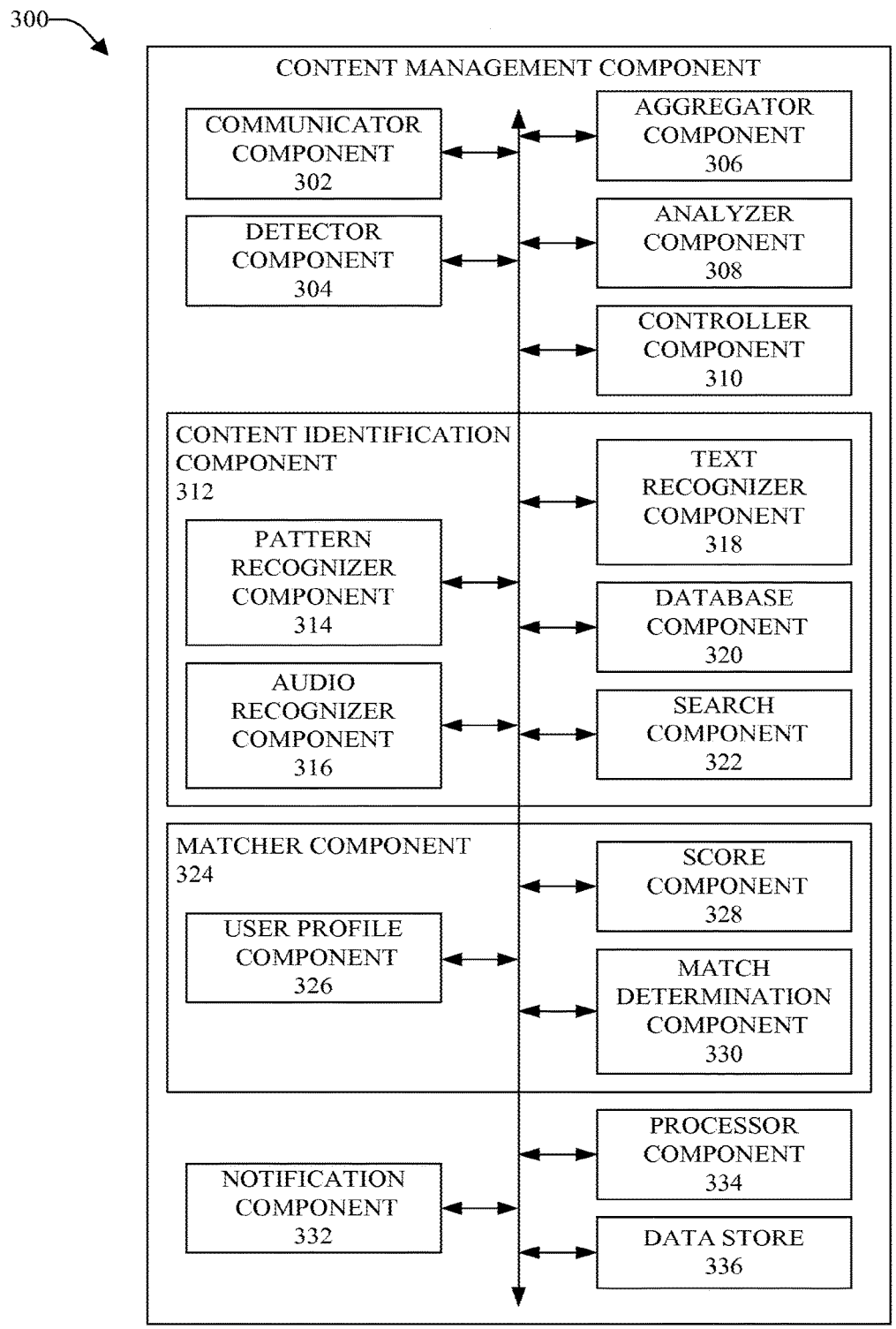
FIG. 3 illustrates a diagram of an example content management component in accordance with various aspects and implementations disclosed herein.

FIG. 3 illustrates a block diagram of an example content management component 300 in accordance with various aspects and implementations disclosed herein. The content management component 300 can be contained within or associated with (e.g., communicatively connected to) a communication device. The content management component 300 can include a communicator component 302, a detector component 304, an aggregator component 306, and an analyzer component 308.

The communicator component 302 can be used to communicate (e.g., transmit, receive) information between the content management component 300 and other components (e.g., communication device(s), component(s) in a communication network, search engine(s), content provider component(s), user interface(s), processor component(s), data store(s), etc.). The information can include, for example, content uploaded to or available for presentation by a content provider component, information relating to users (e.g., users who view or otherwise perceive content), notification messages, and/or other information. The content management component 300 can use certain of the information, such as uploaded content (e.g., video or audio content), to facilitate determining whether the content is time-sensitive and/or news-related content, whether the user has at least a defined threshold level of interest in content determined to be time-sensitive and/or news-related content, and/or whether to transmit a notification relating to content determined to be time-sensitive and/or news-related content to a communication device or destination address associated with a user, etc. The communicator component 302 also can be employed to, for example, transmit a notification message regarding time-sensitive and/or news-related content to a communication device associated with a user to facilitate notifying the user about time-sensitive and/or news-related content of interest or at least potentially of interest to the user.

The detector component 304 can monitor information, including video or audio content, textual content (e.g., relating to the video or audio content), hyperlink information (e.g., hyperlinks to video or audio content), and/or other information being communicated (e.g., uploaded, downloaded, transmitted, received, etc.) in connection with content provider components. The detector component 304 can detect when video or audio content has been uploaded to a content provider component, which can facilitate triggering analyzing the uploaded video or audio comment by the content management component 300 to facilitate determining whether such content is time-sensitive and/or news-related content. The detector component 304 also can detect other information, such as textual information associated with the video or audio content (e.g., as contained on the online page having the video or audio content, or a hyperlink on another online page that references the video or audio content and textual information associated with the hyperlink. The detector component 304 also can facilitate capturing the video or audio content, information (e.g., textual information, hyperlinks, etc.) relating to the video or audio content, etc.

The aggregator component 306 can aggregate data received (e.g., obtained) from various entities (e.g., communication device(s), component(s) in a communication network, search engine(s), content provider component(s), user interface(s), processor component(s), data store(s), etc.). The aggregator component 306 can correlate respective items of data based at least in part on type of data, source of the data, time or date the data was generated or received, section of content associated with the data, etc., to facilitate analyzing of the data by the analyzer component 308.

The analyzer component 308 can analyze content (e.g., video content, audio content, textual content, etc.) to facilitate determining whether the content is time-sensitive and/or news-related content, whether the user has at least a defined threshold level of interest in content determined to be time-sensitive and/or news-related content, and/or whether to transmit a notification relating to content determined to be time-sensitive and/or news-related content to a communication device or destination address associated with a user, etc., and can generate analysis results, based at least in part on the content analysis. For example, the analyzer component 308 (e.g., in conjunction with a content identifier component 312) can analyze video or audio content, and/or other information relating the video or audio content, to facilitate determining whether the video or audio content is time-sensitive and/or news-related content based at least in part on defined content identification criterion(s), as more fully described herein. The analyzer component 308 can generate analysis results relating to the analysis of the video or audio content, and/or other information relating the video or audio content, and can provide the analysis results to, for example, a controller component 310, content identifier component 312, or another component (e.g., processor component 334, data store 336) of the content management component 300.

The controller component 310 can control operations of the various components of the content management component 300 and/or can provide instructions to the various components of the content management component 300 to facilitate the performance of various tasks and functions by the various components of the content management component 300. In some implementations, the controller component 310 can operate in conjunction with the processor component 334 to facilitate controlling operations of the various components and/or the performing of operations by the various components of the content management component 300.

The content identifier component 312 (e.g., classifier component) can analyze the video or audio content, and/or the other related information (e.g., in conjunction with the analyzer component 308), and can determine whether the video or audio content is time-sensitive and/or news-related content, based at least in part on the analysis results. The content identifier component 312 can include, for example, a pattern recognizer component 314, an audio recognizer component 316, a text recognizer component 318, a database component 320, and a search component 322.

The pattern recognizer component 314 can facilitate analyzing video content and can use one or more pattern recognition techniques, algorithms, and/or functions that can facilitate recognizing and/or identifying visual objects or visual information in or associated with the video content to facilitate identifying one or more entities (e.g., person(s), place(s), thing(s), etc.) presented in the video content. The audio recognizer component 316 can facilitate analyzing audio content (e.g., audio content associated with video content, audio content of an audio file, etc.) and can use one or more voice recognition techniques, algorithms, and/or functions that can facilitate recognizing and/or identifying audio objects or audio information in or associated with the presented content (e.g., video or audio content) to facilitate identifying one or more entities (e.g., person(s), place(s), thing(s), etc.) presented in the video or audio content. The text recognizer component 318 (e.g., optical character recognition component) can facilitate analyzing textual information associated with the video or audio content and can use one or more text recognition techniques, algorithms, and/or functions that can facilitate recognizing and/or identifying alphanumeric characters in or associated with the video or audio content to facilitate identifying one or more entities (e.g., person(s), place(s), thing(s), event(s), etc.) presented in the video or audio content.

The database component 320 can facilitate generating, maintaining, storing, or updating one or more databases that can include information that can facilitate determining whether video or audio content is time-sensitive and/or news-related content, wherein the information (e.g., items of information) can comprise information relating to entities (e.g., person(s), place(s), thing(s), event(s), etc.), information relating to news items (e.g., news events), and/or contextual information relating to the content, etc. The database component 320 also can facilitate obtaining information that can be used to update the one or more databases (e.g., in relation to determining whether content is time-sensitive and/or news-related content). For example, in response to the detector component 304 detecting that video content has been uploaded to a content provider component, the controller component 310, content identifier component 312, or database component 320 can generate a search request or query, and can transmit the search request or query to the search component 322, based at least in part on an analysis (e.g., partial or interim analysis) of the video content. The search request or query can include one or more search terms or phrases that can be used in a search of one or more content or information provider components.

For instance, based on an interim analysis of the video content, the content identifier component 312 can determine that the video content relates to President Obama, and also can determine that the content identifier component 312 can use additional information to facilitate determining whether the video content is recent news-related content (e.g., time-sensitive news-related content) or an older video of President Obama that is not recent news-related content. In response, the content identifier component 312 can generate a search query comprising search terms that can facilitate determining whether the news-related content regarding President Obama is recent news-related content (e.g., time-sensitive news-related content). The search component 322 can execute the search query, wherein one or more content provider components can be searched in response to the search query to facilitate identifying one or more search results that can be responsive to the search query. The search component 322 can receive or generate one or more search results that can be responsive to the search query. The database component 320 can update the one or more databases with at least a portion of the information obtained from the search results. The content identifier component 312 can analyze the information in the updated database(s) and/or analyze the information obtained from the search results to facilitate determining whether the content is time-sensitive news-related content.

The content management component 300 also can include a matcher component 324 (e.g., interest identifier component) that can facilitate matching time-sensitive and/or news-related content with a user who will be interested or at least potentially will be interested in the time-sensitive and/or news-related content. The matcher component 324 can include a user profile component 326, a score component 328, and a match determination component 330.

The user profile component 326 can facilitate generating, maintaining, storing, or updating one or more user profiles that can be respectively associated with one or more users (e.g., user who accesses video or audio content online using a communication device). The user profile component 326 can compile user-related information relating to a user and can store the user-related information in the user profile associated with the user, wherein the user profile can be stored in the data store 336. The user-related information can include, for example, information relating to interests of the user, user preferences (e.g., preferences regarding interests selected by the user, preferences regarding notifications regarding content, etc.), information relating to online viewing history (e.g., online viewing of video or audio content, online viewing of web sites, etc.) associated with the user and/or the user's communication device, demographic information relevant to the user, etc.

The score component 328 can determine or calculate an interest score that can indicate a level of interest the user has or at least potentially may have in the time-sensitive and/or news-related content based at least in part on the analysis of the content and user-related information contained in a user profile associated with the user, as more fully described herein (e.g., as more fully described herein with regard to the content management component). The match determination component 330 can determine whether the interest score satisfies (e.g., meets or exceeds) a defined threshold interest score to facilitate determining whether there is a match between the user and the content, as more fully described herein (e.g., as more fully described herein with regard to the content management component). For instance, the match determination component 330 can determine that there is a match between a user and the time-sensitive and/or news-related content in response to determining that the interest score associated with the user in connection with the content satisfies the defined threshold interest score.

The content management component 300 also can contain a notification component 332 that can generate notification messages that can be sent to communication devices associated with users who have an interest or at least potentially will have an interest in the time-sensitive and/or news-related content, for example, in response to the matcher component 324 determining that the user will have or at least potentially will have an interest in the time-sensitive and/or news-related content, as more fully described herein (e.g., as more fully described herein with regard to the content management component). The content management component 300, for example, using the communicator component 302, can transmit the notification message to a communication device and/or destination address (e.g., email address, social networking address, phone number, etc.) associated with the user to facilitate notifying the user about the time-sensitive and/or news-related content.

In some implementations, the content management component 300 also can include a processor component 334 that can operate with the other components (e.g., communicator component 302, detector component 304, aggregator component 306, analyzer component 308, etc.) to facilitate performing the various functions of the content management component 300. The processor component 334 can employ one or more processors, microprocessors, or controllers that can process data, such as information relating to content, information relating to other operations of the content management component 300, and/or other information, etc., to facilitate determining whether the content is time-sensitive and/or news-related content, determining whether a user has at least a defined threshold level of interest in content determined to be time-sensitive and/or news-related content, determining whether to transmit a notification relating to content determined to be time-sensitive and/or news-related content to a communication device or destination address associated with a user, and/or performing other operations associated with the content management component 300, as more fully disclosed herein. The processor component 334 can control or manage data flow between the content management component 300 and other components (e.g., communication device(s), component in a communication network, content provider component(s), search engine(s), user interface(s), processor component(s), data store(s), etc.) associated with the content management component 300.

The content management component 300 also can include a data store 336 that can store data structures (e.g., user data, video content, metadata), instructions, procedures, and/or code structure(s) (e.g., modules, objects, hashes, classes) to facilitate performing or controlling operations associated with the content management component 300. The data store 336 also can store information (e.g., content, information relating to content, pattern recognition algorithm(s), audio recognition algorithm(s), text recognition algorithm(s), defined content identification criteria (and/or corresponding rules), defined match criteria (and/or corresponding rules), etc.) that can facilitate determining whether the content is time-sensitive and/or news-related content, determining whether a user has at least a defined threshold level of interest in content determined to be time-sensitive and/or news-related content, determining whether to transmit a notification relating to content determined to be time-sensitive and/or news-related content to a communication device or destination address associated with a user, and/or performing or controlling other operations associated with the content management component 300. The processor component 334 can be coupled (e.g., through a memory bus) to the data store 336 in order to store and retrieve information desired to operate and/or confer functionality, at least in part, to the components (e.g., communicator component 302, detector component 304, aggregator component 306, analyzer component 308, etc.) of the content management component 300, and/or substantially any other operational aspects of the content management component 300.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 4:
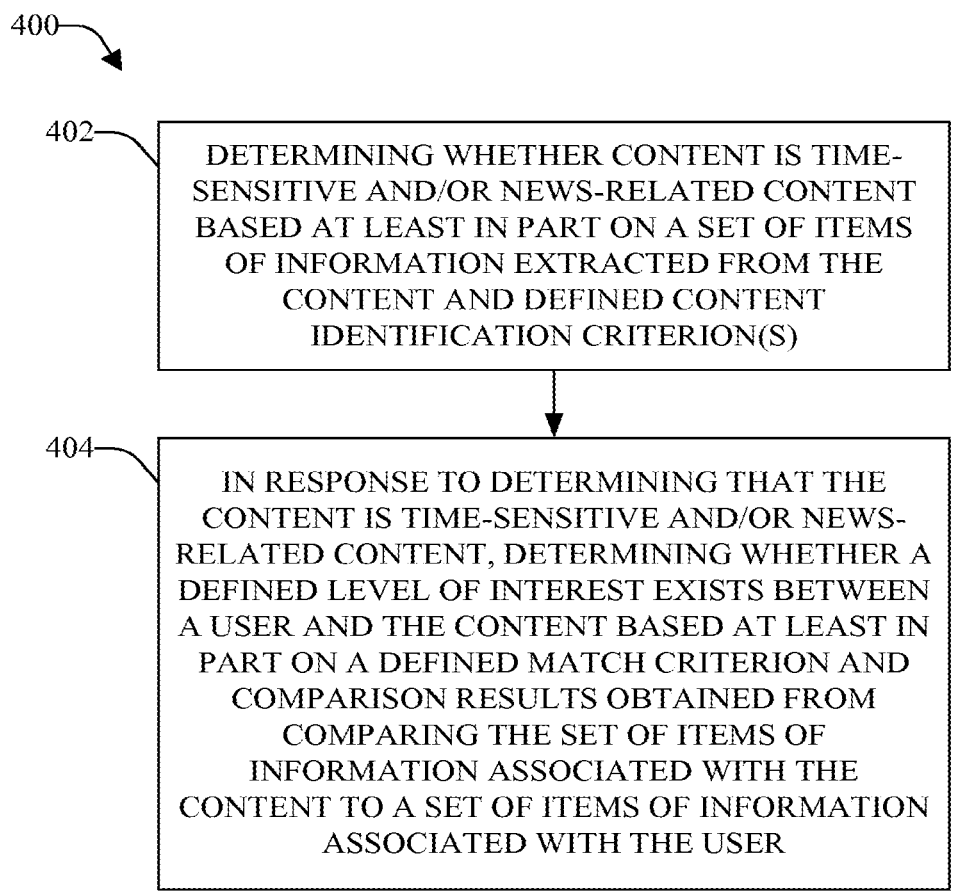
FIG. 4 depicts a flow chart of an example method that can facilitate determining whether content is time-sensitive and/or news-related content and notifying a communication device associated with a user of time-sensitive and/or news-related content that is at least potentially of interest in the content, in accordance with various aspects and implementations described herein.
Figure 5:
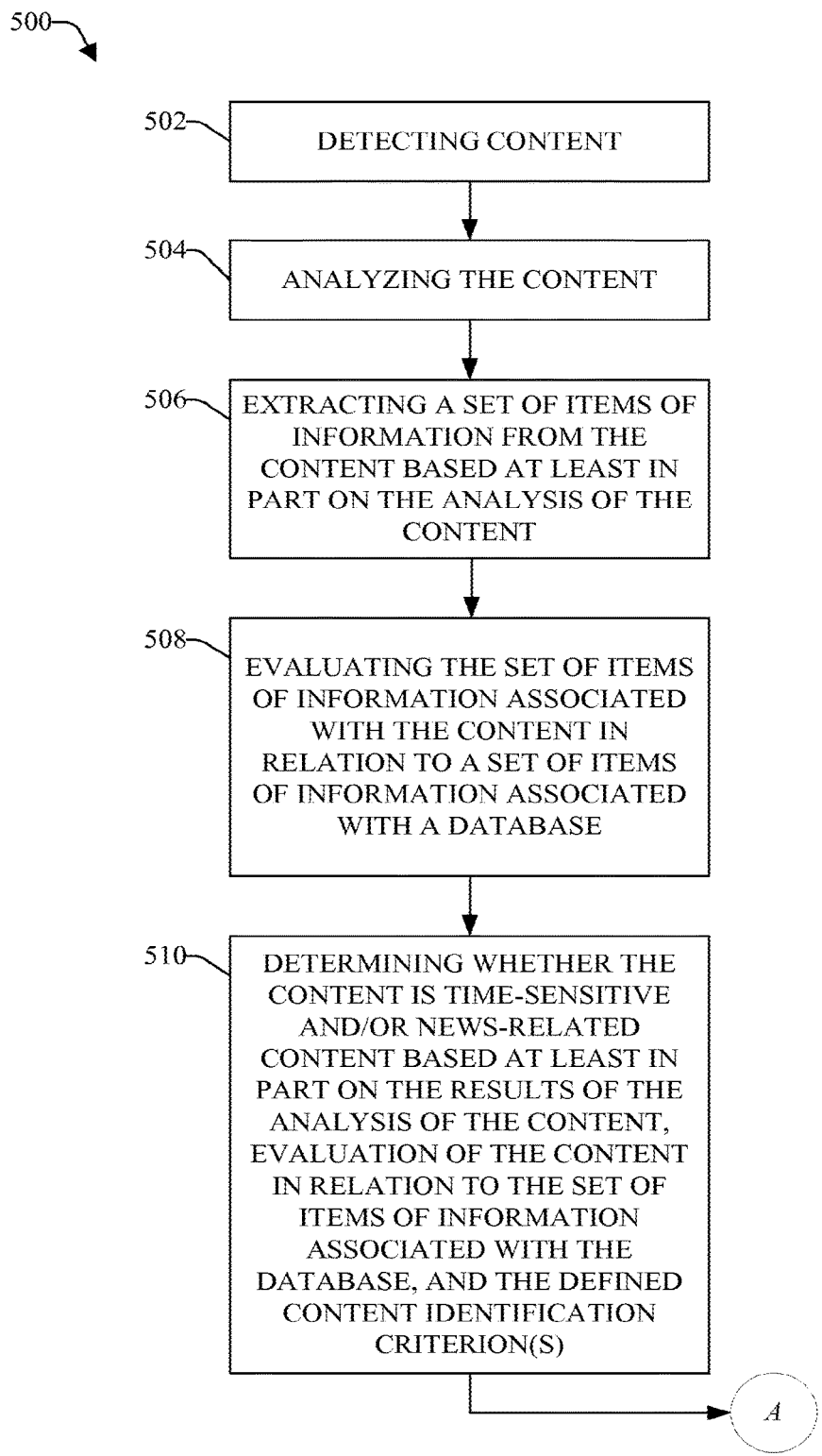
FIG. 5 depicts a flow chart of an example method that can facilitate determining whether content is time-sensitive and/or news-related content, in accordance with various aspects and implementations of the disclosed subject matter.
Figure 6:
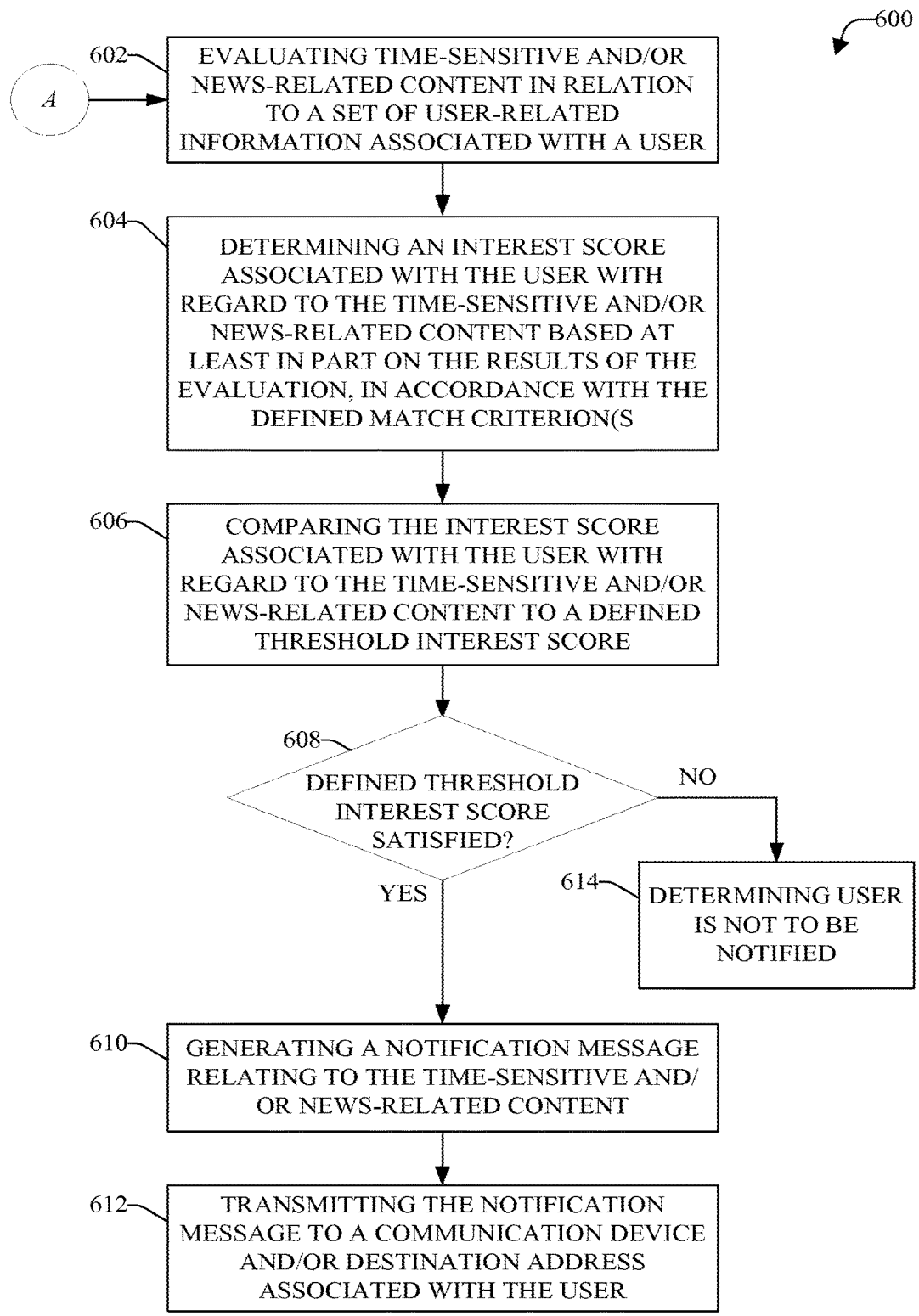
FIG. 6 illustrates a flow chart of an example method that can facilitate determining whether a user has at least a defined threshold level of interest (e.g., corresponding to a defined threshold interest score) in time-sensitive and/or news-related content and whether to notify the user of such content.

In view of the example systems, components, and devices described above, example methods that can be implemented in accordance with this disclosure can be further appreciated with reference to flowcharts in FIGS. 4-6. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

With reference to FIG. 4, illustrated is a flow chart of an example method 400 that can facilitate determining whether content is time-sensitive and/or news-related content and notifying a communication device associated with a user of time-sensitive and/or news-related content that is at least potentially of interest in the content, in accordance with various aspects and implementations described herein. The method 400 can be used, for example, by a content management component.

At 402, a determination can be made regarding whether content is time-sensitive and/or news-related content based at least in part on a set of items of information extracted from the content and the defined content identification criterion(s). The content can comprise video or audio content. The content management component can analyze the content and extract one or more items of information (e.g., information that can facilitate identifying a person(s), place(s), thing(s), event(s), etc., in the content) from the content based at least in part on the content analysis. The content management component also can analyze information, including textual information (e.g., information that is describing and/or commenting on the content, information associated with a hyperlink to the content, etc.), associated with the content to identify one or more other items of information associated with the content. The content management component further can analyze information contained in a database component that can be compared with or evaluated in relation to the set of items of information associated with the content to facilitate determining whether the content is time-sensitive and/or news-related content. The content management component can determine whether the content is time-sensitive and/or news-related content based at least in part on a set of items of information extracted from the content, information associated with the content, information stored in the database component, and/or the defined content identification criterion(s).

At 404, in response to determining that the content is time-sensitive and/or news-related content, a determination can be made regarding whether a defined level of interest exists between a user and the content based at least in part on a defined match criterion (e.g., the defined level of interest satisfying a defined threshold level of interest) and comparison results obtained from comparing the set of items of information associated with the content to a set of items of information associated with a user (e.g., in a user profile associated with the user). In response to determining that the content is time-sensitive and/or news-related content, the content management component can facilitate determining whether there is a match (e.g., a match indicating user interest in the content) between the time-sensitive and/or news-related content and a user(s) of a plurality of users based at least in part on the set of items of information associated with the content and respective sets of items of information contained in respective user profiles of a plurality of user profiles associated with the plurality of users. To facilitate the interest-match determination, the content management component can retrieve (e.g., read) the respective sets of information from the respective user profiles, which can be stored in a data store associated with the content management component.

For example, as part of the interest-match determination, the content management component can determine or calculate an interest score that can indicate a level of interest or potential level of interest a user can have in the time-sensitive and/or news-related content based at least in part on respective sets of items of information contained in the user profile associated with the user and the set of items of information associated with the content. The content management component can determine whether the defined level of interest exists between a user and the time-sensitive and/or news-related content based at least in part on the defined match criterion and the comparison results obtained from comparing the set of items of information associated with the content to the set of items of information contained in the user profile associated with the user. For instance, the content management component can determine whether the interest score associated with the user satisfies (e.g., meets or exceeds) the defined threshold interest score that can indicate the defined level of interest in the time-sensitive and/or news-related content exists.

In response to determining that the defined level of interest in the time-sensitive and/or news-related content exists with regard to a user, the content management component can generate a notification message relating to the content, and can transmit the notification to a communication device or communication address (e.g., email address, phone number, social networking address, etc.) associated with the user to facilitate notifying the user about the time-sensitive and/or news-related content.

Referring to FIG. 5, depicted is a flow chart of an example method 500 that can facilitate determining whether content is time-sensitive and/or news-related content, in accordance with various aspects and implementations of the disclosed subject matter. The method 500 can be used, for example, by a content management component.

At 502, content can be detected. The content management component can monitor information (e.g., content, such as video or audio content) being uploaded to one or more content provider components, e.g., associated with a communication network. The content management component can detect when video or audio content is uploaded to the one or more content provider components at or near the time the content is uploaded.

At 504, the content can be analyzed. For example, a content management component can analyze the detected video or audio content, and/or other content (e.g., textual information, metadata, etc.) associated with the video or audio content (e.g., closed-caption information, transcript, and/or descriptive information relating to the content posted on the online page comprising the video or audio content or posted on another online page that provides a hyperlink to the online page comprising the video or audio content). The content management component can analyze the content to facilitate determining whether the content is time-sensitive and/or news-related content (e.g., recent news-related content or other recent content (e.g., content comprising events that have recently occurred) that has relevancy for a period of time), based at least in part on a defined content identification criterion(s). As part of the content analysis, the content management component can employ pattern recognition techniques, audio or voice recognition techniques, and/or text recognition techniques to facilitate extracting items of information and/or identifying items of information (e.g., people(s), place(s), thing(s), event(s), etc.) presented in or associated with the content.

At 506, a set of items of information can be extracted from the content based at least in part on the analysis of the content. As part of the content analysis, the content management component can identify or extract the set of items of information presented in the content using the disclosed recognition techniques and/or can identify other items of information (e.g., textual information) associated with the content. The set of items can be or relate to an identification of a person(s) presented in the content, an identification of a place(s) presented in the content, an object(s) (e.g., a thing, a product, etc.) presented in the content, an event(s) (e.g., President Obama giving his inauguration speech) that is presented in the content, determination or identification of the time or period of time that the event(s) occurred, words or phrases presented in or associated with the content, etc. The content management component also can analyze the respective items of information associated with the content.

At 508, the set of items of information associated with the content can be evaluated in relation to (e.g., in connection with) a set of items of information associated with a database. As part of the content analysis, the content management component can evaluate the set of items of information associated with the content in relation to (e.g., in connection with) the set of items of information associated with a database, wherein the set of items of information associated with the database can facilitate determining whether the content is time-sensitive and/or news-related content. For example, the set of items of information associated with the content can comprise a not-yet-identified item(s) associated with the content that represents a visual depiction of President Obama giving his inauguration speech. The set of items of information associated with the database can comprise an item(s) of information that is known to represent a visual depiction (e.g., a different visual depiction) of President Obama (e.g., from a prior event). The content management component can compare or evaluate the not-yet-identified item(s) associated with the content that represents a visual depiction of President Obama giving his inauguration speech with the item(s) of information that is known to represent a visual depiction of President Obama, and based at least in part on that comparison or evaluation, can determine that the content comprises an item(s) of information (e.g., video images) of or relating to President Obama. In accordance with the content identification criterion(s), the content management component can use this identification of President Obama being in the video content to facilitate determining whether the content is time-sensitive and/or news-related content.

At 510, a determination can be made regarding whether the content is time-sensitive and/or news-related content based at least in part on the results of the analysis of the content (including the set of items of information), evaluation of the content in relation to the set of items of information associated with the database, and the defined content identification criterion(s). The content management component can determine whether the content is time-sensitive and/or news-related content based at least in part on the analysis results, including the analysis results relating to the items of information, the evaluation of the content in relation to the set of items of information stored in the database, and the defined content identification criterion(s), as more fully described herein.

In response to determining that the content is time-sensitive and/or news-related content, the content management component can proceed to determine whether a user(s) has at least a defined threshold level of interest (e.g., corresponding to a defined threshold interest score) in the time-sensitive and/or news-related content to facilitate determining whether to send a notification message relating to the time-sensitive and/or news-related content to the communication device(s) of the user(s), as more fully disclosed, for example, with regard to the method 600 and FIG. 6, or as otherwise disclosed herein. For example, the method 500 can be at reference point A after it is determined that the content is time-sensitive and/or news-related content, and method 600 can proceed from reference point A. If the content management component determines that the content is not time-sensitive and/or news-related content, based at least in part on the content identification criteria, the content management component can determine that it is not necessary to perform a user interest analysis with regard to the content.

FIG. 6 illustrates a flow chart of an example method 600 that can facilitate determining whether a user has at least a defined threshold level of interest (e.g., corresponding to a defined threshold interest score) in time-sensitive and/or news-related content and whether to notify the user of such content, in accordance with various aspects and implementations of the disclosed subject matter. The method 600 can be used, for example, by a content management component. In some implementations, the method 600 can proceed from reference point A associated with the method 500, wherein, at that point, it has been determined that the content is time-sensitive and/or news-related content.

At 602, the time-sensitive and/or news-related content can be evaluated (e.g., compared) in relation to a set of user-related information associated with a user. For all or a desired portion of users, the content management component can retrieve a set of user-related information (e.g., user preferences or interests, content viewing history, demographic information, etc.) associated with the user, for example, from a user profile stored in a data store. The content management component can compare the time-sensitive and/or news-related content with the set of user-related information associated with a user to facilitate identifying items of information associated with the content that can be in common or substantially in common with items of user-related information associated with the user or identifying relationships between the items of information associated with the content and the set of user-related information indicating an interest or a potential interest in the content by the user, and/or conversely, identifying items of information associated with the content that are not in common or are substantially not in common with items of user-related information associated with the user or identifying or identifying relationships between the items of information associated with the content and the set of user-related information indicating a lack of interest or a potential lack of interest in the content by the user.

At 604, an interest score associated with the user with regard to the time-sensitive and/or news-related content can be determined based at least in part on the results of the evaluation of the time-sensitive and/or news-related content and the set of user-related information associated with a user, in accordance with the defined match criterion(s). The content management component can determine an interest score associated with the user with regard to the time-sensitive and/or news-related content. Based at least in part on the results of the evaluation associated with the operation at 602, the content management component can facilitate determining or calculating the interest score, for example, by increasing the interest score (e.g., an interim interest score) based in part on relationships between an item of information associated with the content and an item of user-related information associated with the user indicating an interest or a potential interest in the content by the user and/or by decreasing the interest score (e.g., the interim interest score) based in part on relationships between an item of information associated with the content and an item of user-related information associated with the user indicating a lack of interest or a potential lack of interest in the content by the user. The content management component also can respectively weight (e.g., can apply respective score weightings) to respective types of information (e.g., topics, person's name or specific identification information, date or time, etc.). For example, more general types of information (e.g., politics, sports, cooking, etc.) can be weighted with a first weight value, while more specific types of information (e.g., name of an entity (e.g., name of a person, company, building, etc.), name and type of entity (e.g., name of a celebrity, name of a politician, name of an athlete, etc.) can be weighted with a second weight value. In some implementations, the second weight value can be higher than the first weight value (e.g., due to the information associated with the second weight value being more specific than the general types of information associated with the first weight value. In other implementations, as desired, the second weight value can be the same as the first weight value or less than the first weight value.

At 606, the interest score associated with the user with regard to the time-sensitive and/or news-related content can be compared to a defined threshold interest score. The content management component can compare the interest score associated with the user with the defined threshold interest score to facilitate determining whether the user has a sufficient level of interest in the time-sensitive and/or news-related content such that a notification message regarding such content is to be sent to the communication device and/or destination address associated with the user to notify the user about the time-sensitive and/or news-related content. For example, an interest score associated with a user that meets or exceeds the defined threshold interest score can indicate that the user will have or at least potentially will have an interest in the time-sensitive and/or news-related content, and an interest score associated with a user that is lower than the defined threshold interest score can indicate that the user will not have or at least potentially (e.g., likely) will not have an interest in the time-sensitive and/or news-related content.

At 608, a determination can be made regarding whether the interest score associated with the user satisfies (e.g., meets or exceeds) the defined threshold interest score based at least in part on the results of the comparison of the interest score with the defined threshold interest score. The content management component can determine whether the interest score associated with the user satisfies the defined threshold interest score based at least in part on the results of the comparison of the interest score with the defined threshold interest score.

If, at 608, it is determined that the interest score associated with the user satisfies (e.g., meets or exceeds) the defined threshold interest score, at 610, a notification message relating to the time-sensitive and/or news-related content can be generated. The content management component can generate the notification message in response to determining that the interest score associated with the user satisfies the defined threshold interest score. The notification message can include information, such as, for example, a brief description or summary of the time-sensitive content, a link (e.g., hyperlink) to the time-sensitive content, information that can indicate when or how long ago the event (e.g., news event) presented in the time-sensitive content occurred, an identified interest level (e.g., high interest level, very high interest level, etc.; 80% interest level, 90% interest level, etc.) that can indicate the interest level the content management component has identified for the user in relation to the content, etc. At 612, the notification message can be transmitted to a communication device and/or destination address associated with the user. The content management component can transmit the notification message to a communication device and/or destination address (e.g., email address, social networking address, phone number, etc.) associated with the user to facilitate notifying the user about the time-sensitive and/or news-related content.

Referring again to reference numeral 608, if, at 608, it is determined that the interest score associated with the user does not satisfy (e.g., is lower than) the defined threshold interest score, at 614, a determination can be made that the user is not to be notified about the time-sensitive and/or news-related content, and no notification message is generated.

Figure 7:
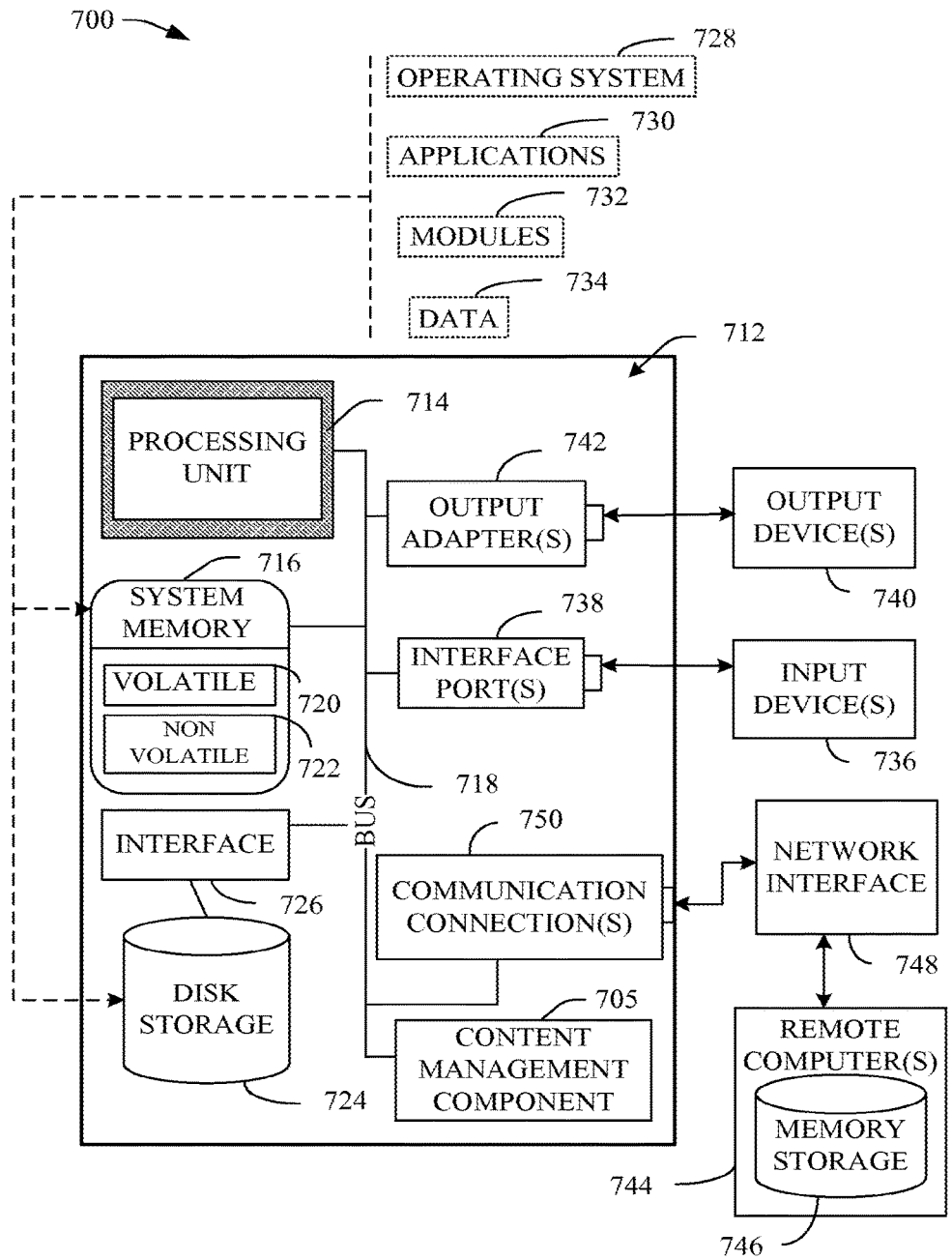
FIG. 7 is a schematic block diagram illustrating a suitable operating environment.
Figure 8:
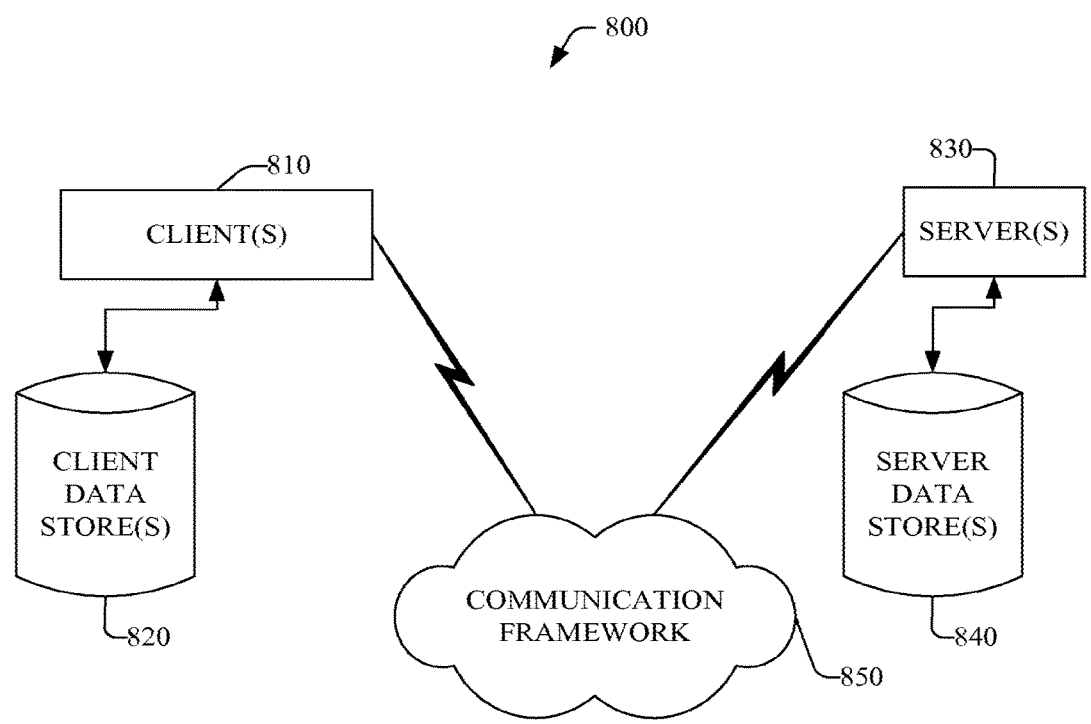
FIG. 8 is a schematic block diagram of a sample-computing environment.

In order to provide a context for the various aspects of the disclosed subject matter, FIGS. 7 and 8 as well as the following discussion are intended to provide a brief, general description of a suitable environment in which the various aspects of the disclosed subject matter may be implemented. With reference to FIG. 7, a suitable operating environment 700 for implementing various aspects of this disclosure includes a computer 712. The computer 712 includes a processing unit 714, a system memory 716, and a system bus 718. It is to be appreciated that the computer 712 can be used in connection with implementing one or more of the systems or components shown and described in connection with FIGS. 1-3. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 712 also includes removable/non-removable, volatile/non-volatile computer storage media. FIG. 7 illustrates, for example, a disk storage 724. Disk storage 724 includes, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used, such as interface 726.

FIG. 7 also depicts software that acts as an intermediary between users and the basic computer resources described in the suitable operating environment 700. Such software includes, for example, an operating system 728. Operating system 728, which can be stored on disk storage 724, acts to control and allocate resources of the computer 712. System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

In accordance with various aspects and implementations, the computer 712 can be used to present content (e.g., video content, audio content, textual content, etc.), perform information searches (e.g., execute search queries or present search queries for execution), augment information searches (e.g., augment search queries), and/or present search results (e.g., customized search results), etc., as more fully disclosed herein. In some implementations, the computer 712 can include a plurality of processors that can be used to process data and perform computing tasks (e.g., encoding-related tasks and/or decoding-related tasks, etc.), as more fully disclosed herein. In certain exemplary embodiments, the computer 712 can include a content management component 705 (as depicted) that can function as more fully disclosed herein to facilitate determining whether content (e.g., newly uploaded content) is time-sensitive and/or news-related content, and, with regard to content determined to be time-sensitive and/or news-related content, determining an interest level (e.g., corresponding to an interest score) a user has or at least potentially may have in such content, determining whether to send a notification message regarding such content to a communication device or destination address associated with the user based at least in part on the interest level associated with the user in relation to the content, and/or performing other operations associated with the content management component 705, as more fully disclosed herein. In various other implementations, the computer 712 can be utilized by a search engine (not shown in FIG. 7) to facilitate executing a search query, searching information databases (e.g., associated with content provider components), and/or generating search results, etc., and/or can be utilized by an content provider component (not shown in FIG. 7) to facilitate storing information (e.g., video content, audio content, textual content, etc.) and providing information that can be responsive to a search query, for example.

FIG. 8 is a schematic block diagram of a sample-computing environment 800 with which the subject matter of this disclosure can interact. The sample-computing environment 800 includes one or more client(s) 810. The client(s) 810 can be hardware and/or software (e.g., threads, processes, computing devices). The sample-computing environment 800 also includes one or more server(s) 830. Thus, sample-computing environment 800 can correspond to a two-tier client server model or a multi-tier model (e.g., client, middle tier server, data server), amongst other models. The server(s) 830 can also be hardware and/or software (e.g., threads, processes, computing devices). The servers 830 can house threads to perform transformations by employing this disclosure, for example. One possible communication between a client 810 and a server 830 may be in the form of a data packet transmitted between two or more computer processes.

The sample-computing environment 800 includes a communication framework 850 that can be employed to facilitate communications between the client(s) 810 and the server(s) 830. The client(s) 810 are operatively connected to one or more client data store(s) 820 that can be employed to store information local to the client(s) 810. Similarly, the server(s) 830 are operatively connected to one or more server data store(s) 840 that can be employed to store information local to the servers 830.

It is to be appreciated and understood that components (e.g., communication device, communication network, content provider component, content management component, content identifier component, matcher component, database component, notification component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablet, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "engine," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, using a hardware processor, for presenting content, the method comprising:
retrieving a model that represents newsworthy content as a vector of binary values, wherein the newsworthy content includes time-sensitive news-related content and wherein each bit of the vector corresponds to an entity, a word, a phase, a search query, or a tag;
receiving a media content item;
in response to receiving the media content item, extracting a plurality of visual objects that are depicted in image portions of the media content item;
determining whether one or more visual objects of the plurality of visual objects match one or more visual objects in a database of stored visual objects associated with previously identified physical entities depicted in other media content items;
in response to determining that an extracted visual object matches a visual object in the database of stored visual objects, determining, based at least on the obtained model, whether the media content item contains newsworthy content by at least performing a search using a search query that includes one or more search terms corresponding to the extracted visual object and analyzing search results responsive to the search query;

in response to determining that the media content item contains the newsworthy content, calculating an interest score based on user-related information contained in a user profile of a user for consuming the newsworthy content;

determining whether the user is likely to have at least a defined interest level in the newsworthy content based on the calculated interest score; and in response to determining that the user is likely to have at least the defined interest level in the newsworthy content, transmitting a notification to a communication device associated with the user, wherein the notification directs the communication device to the newsworthy content.

2. The method of claim 1, wherein the one or more visual objects in the database of stored visual objects are associated with entity information, and wherein the media content item is determined to contain newsworthy content based on respective entity information associated with a matching visual object in the database of stored visual objects.

3. The method of claim 1, further comprising using audio recognition to identify audio information presented in an audio portion of the media content item, wherein the media content item is determined to contain newsworthy content based on the audio information.

4. The method of claim 1, further comprising analyzing textual information associated with the media content item, wherein the media content item is determined to contain newsworthy content based on the textual information.

5. The method of claim 4, wherein the textual information includes closed-caption textual information.

6. The method of claim 4, wherein the textual information includes user comments relating to the media content item provided by other users.

7. The method of claim 1, further comprising:
applying the model to at least a portion of the media content item to determine whether the media content item contains newsworthy content.

8. A system for presenting content, comprising:
a memory that stores computer-executable instructions; and
a hardware processor that, when executing the computer-executable instructions stored in the memory, is configured to:
retrieve a model that represents newsworthy content as a vector of binary values, wherein the newsworthy content includes time-sensitive news-related content and wherein each bit of the vector corresponds to an entity, a word, a phase, a search query, or a tag;
receive a media content item;
in response to receiving the media content item, extract a plurality of visual objects that are depicted in image portions of the media content item;
determine whether one or more visual objects of the plurality of visual objects match one or more visual objects in a database of stored visual objects associated with previously identified physical entities depicted in other media content items;
in response to determining that an extracted visual object matches a visual object in the database of stored visual objects, determining, based at least on the obtained model, whether the media content item contains newsworthy content by at least performing a search using a search query that includes one or more search terms corresponding to the extracted visual object and analyzing search results responsive to the search query;

in response to determining that the media content item contains the newsworthy content, calculate an interest score based on user-related information contained in a user profile of a user for consuming the newsworthy content;

determine whether the user is likely to have at least a defined interest level in the newsworthy content based on the calculated interest score; and in response to determining that the user is likely to have at least the defined interest level in the newsworthy content, transmit a notification to a communication device associated with the user, wherein the notification directs the communication device to the newsworthy content.

9. The system of claim 8, wherein the one or more visual objects in the database of stored visual objects are associated with entity information, and wherein the media content item is determined to contain newsworthy content based on respective entity information associated with a matching visual object in the database of stored visual objects.

10. The system of claim 8, wherein the hardware processor is further configured to use audio recognition to identify audio information presented in an audio portion of the media content item, wherein the media content item is determined to contain newsworthy content based on the audio information.

11. The system of claim 8, wherein the hardware processor is further configured to analyze textual information associated with the media content item, wherein the media content item is determined to contain newsworthy content based on the textual information.

12. The system of claim 11, wherein the textual information includes closed-caption textual information.

13. The system of claim 11, wherein the textual information includes user comments relating to the media content item provided by other users.

14. The system of claim 8, wherein the hardware processor is further configured to:
apply the model to at least a portion of the media content item to determine whether the media content item contains newsworthy content.

15. A non-transitory computer-readable medium containing computer executable instructions that, when executed by a processor, cause the processor to perform a method for presenting content, the method comprising:
retrieving a model that represents newsworthy content as a vector of binary values, wherein the newsworthy content includes time-sensitive news-related content and wherein each bit of the vector corresponds to an entity, a word, a phase, a search query, or a tag;
receiving a media content item;
in response to receiving the media content item, extracting a plurality of visual objects that are depicted in image portions of the media content item;
determining whether one or more visual objects of the plurality of visual objects match one or more visual objects in a database of stored visual objects associated with previously identified physical entities depicted in other media content items;
in response to determining that an extracted visual object matches a visual object in the database of stored visual objects, determining, based at least on the obtained model, whether the media content item contains newsworthy content by at least performing a search using a search query that includes one or more search terms corresponding to the extracted visual object and analyzing search results responsive to the search query;

in response to determining that the media content item contains the newsworthy content, calculating an interest score based on user-related information contained in a user profile of a user for consuming the newsworthy content;

determining whether the user is likely to have at least a defined interest level in the newsworthy content based on the calculated interest score; and in response to determining that the user is likely to have at least the defined interest level in the newsworthy content, transmitting a notification to a communication device associated with the user, wherein the notification directs the communication device to the newsworthy content.

16. The non-transitory computer-readable medium of claim 15, wherein the one or more visual objects in the database of stored visual objects are associated with entity information, and wherein the media content item is determined to contain newsworthy content based on respective entity information associated with a matching visual object in the database of stored visual objects.

17. The non-transitory computer-readable medium of claim 15, wherein the method further comprises using audio recognition to identify audio information presented in an audio portion of the media content item, wherein the media content item is determined to contain newsworthy content based on the audio information.

18. The non-transitory computer-readable medium of claim 15, wherein the method further comprises analyzing textual information associated with the media content item, wherein the media content item is determined to contain newsworthy content based on the textual information.

19. The non-transitory computer-readable medium of claim 18, wherein the textual information includes closed-caption textual information.

20. The non-transitory computer-readable medium of claim 18, wherein the textual information includes user comments relating to the media content item provided by other users.

21. The non-transitory computer-readable medium of claim 15, wherein the method further comprises:

applying the model to at least a portion of the media content item to determine whether the media content item contains newsworthy content.

* * * * *